(No Model.)
J. A. MORRELL.
APPARATUS FOR EVAPORATING LIQUIDS.
No. 441,318.   Patented Nov. 25, 1890.
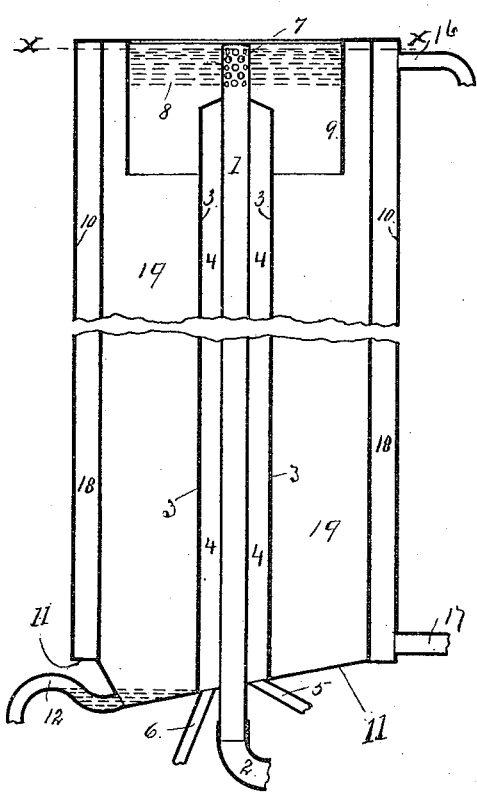
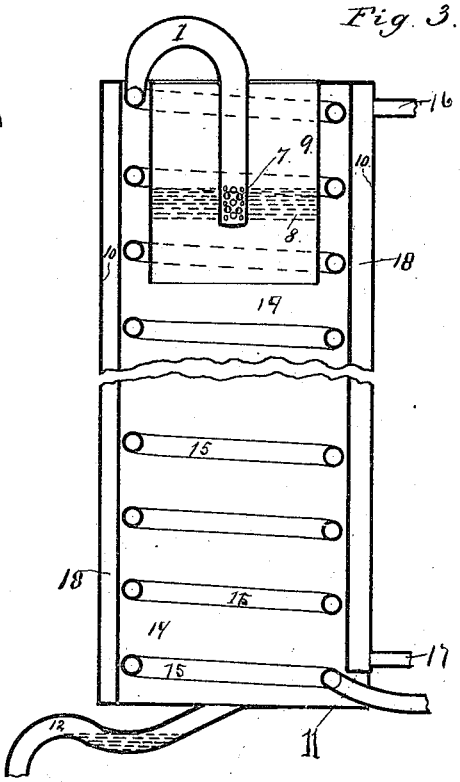
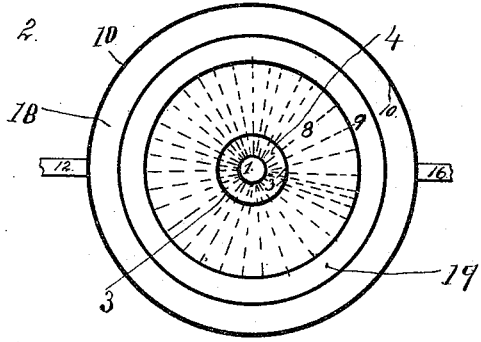
WITNESSES:
INVENTOR
ATTORNEY

UNITED STATES PATENT OFFICE.

JAMES A. MORRELL, OF LANSDALE, ASSIGNOR OF ONE-HALF TO GIDEON W. MARSH, OF PHILADELPHIA, PENNSYLVANIA.

APPARATUS FOR EVAPORATING LIQUIDS.

SPECIFICATION forming part of Letters Patent No. 441,318, dated November 25, 1890.

Application filed December 13, 1888. Serial No. 293,534. (No model.)

*To all whom it may concern:*

Be it known that I, JAMES A. MORRELL, a citizen of the United States, residing at Lansdale, in the county of Montgomery and State of Pennsylvania, have invented certain new and useful Improvements in Apparatus for Evaporating Liquids and Concentrating Solutions; and I do hereby declare the following to be a sufficiently full, clear, and exact description thereof as to enable others skilled in the art to make and use the said invention.

This invention relates to apparatus for concentrating solutions by evaporation, and has for its object the expeditious concentration of solutions with diminished risk of deterioration.

The nature of this invention consists in a combination and arrangement of vessels and tubes hereinafter described, and shown in the accompanying drawings, in which—

Figure 1 shows a vertical section of the apparatus. Fig. 2 is a sectional view taken on the line $x\,x$, Fig. 1, and Fig. 3 a vertical section of a modified form of the same.

The same reference-marks indicate like parts in the several figures.

1 is a vertical pipe receiving a supply of liquid at the lower end through a branch 2, under a sufficient pressure to overcome the elastic force of vapors at that temperature to which the liquid is heated.

3 is a closed jacket surrounding the pipe 1, with a space 4 included, which is kept constantly heated with superheated steam or other heated fluid introduced through the pipe 5 at a temperature above the boiling-point of the solution in the tube 1. A similar pipe 6 is provided for the withdrawal of the water of condensation. The upper end of the tube 1 projects above the jacket 3 and is closed at the top, and has in its periphery above the jacket 3 minute perforations 7, from which jets or sprays 8 of the solution are forcibly ejected horizontally against a cylindric screen 9. Surrounding the screen 9, at some little distance from it, is a cylindric jacket 10, which extends downwardly nearly the entire length of the apparatus, and with the wall of the chamber 19 and the top and bottom portions form a chamber 18. The evaporating-chamber 19 is formed between the chambers 18 and 4, and the said chamber 19 is open at its top and closed at its bottom 11, the latter being provided with a trap-pipe through which the liquid may be drawn off without admitting a circulation or draft of air within said chamber.

The outer surface of the jacket 10 is clothed to avoid waste of heat by radiation, and the jacket is continuously supplied with fluid at a temperature above the boiling-point of the solution to be concentrated by means of a pipe 16. A pipe 17 is provided for the withdrawal of the water of condensation.

The modified form of the apparatus shown in Fig. 3 has a helical pipe 15 substituted for the central pipe 1 and the jacket 3, the helical pipe 15 being coiled near the inner surface of the chamber 18, from which it derives its heat. The upper end of the pipe 15 is bent upward and thence radially to the center of screen 9, and then downward a short distance, being closed at the end and perforated at the sides near the end with minute apertures 7, whence the hot fluid is dispersed radially in a fine spray 8 upon the screen 9, and descending is exposed to further heating from the radiation of heat from the internal surfaces of the jacket 10. During its descent it parts with the moisture very rapidly, and when it collects sufficiently at the base is withdrawn through the trap-pipe 12.

Having described this invention and the operation thereof, what is claimed is—

In a liquid-concentrating apparatus, the combination, with an evaporating-chamber provided at its bottom with a trap-pipe and surrounded by a heating-chamber, of a liquid-feed pipe perforated at its upper end, the heating-chamber 4, surrounding the liquid-feed pipe, and the screen 9, suspended from the top of the evaporating-chamber, said feed-pipe extending entirely through the chamber 4, whereby the liquid becomes highly heated, is sprayed against the said screen, and falls into the evaporating-chamber, substantially as shown and described.

JAMES A. MORRELL.

Witnesses:
LUTHER L. CHENEY,
H. B. S. MORRELL.